United States Patent
Enriquez et al.

(10) Patent No.: US 7,130,414 B2
(45) Date of Patent: Oct. 31, 2006

(54) ACTIVE MODE LINE VOLTAGE REGULATOR FOR RINGING SUBSCRIBER LINE INTERFACE CIRCUIT

(75) Inventors: Leonel Ernesto Enriquez, Melbourne Beach, FL (US); Douglas Youngblood, Palm Bay, FL (US)

(73) Assignee: Intersil Americas Inc., Milpitas, CA (US)

( * ) Notice: Subject to any disclaimer, the term of this patent is extended or adjusted under 35 U.S.C. 154(b) by 235 days.

(21) Appl. No.: 10/090,291

(22) Filed: Mar. 4, 2002

(65) Prior Publication Data
US 2003/0165232 A1  Sep. 4, 2003

(51) Int. Cl.
*H04M 19/00* (2006.01)

(52) U.S. Cl. .................... 379/399.01; 379/322

(58) Field of Classification Search ............ 379/93.05, 379/399.07, 399.01, 413, 387, 395.011, 322–324
See application file for complete search history.

(56) References Cited

U.S. PATENT DOCUMENTS 4,631,366 A * 12/1986 Takato et al. ............... 340/333
4,935,960 A * 6/1990 Takato et al. ............... 379/413
5,160,851 A * 11/1992 McAndrews ............. 455/166.2

* cited by examiner

Primary Examiner—Sinh Tran
Assistant Examiner—Walter F Briney, III
(74) Attorney, Agent, or Firm—Akerman Senterfitt; Neil R. Jetter

(57) ABSTRACT

A voltage regulator circuit arrangement limits the DC voltage applied to a tip and ring amplifiers of a subscriber line interface circuit (SLIC), each of which has a first polarity input coupled to a first current flow path to which a DC input (battery) voltage is coupled. A first current source supplies a first current derived via a low pass filter path from that flowing through the first current flow path to a second polarity input node of the tip amplifier, while a second current source supplies a similarly low pass filter path-derived second current to a second polarity input node of the ring amplifier. A voltage regulator is coupled with the first current flow path and is operative to regulate the voltage at the first polarity inputs of the tip and ring amplifiers to a regulated voltage value Vreg, so that the magnitudes of the first and second currents are based upon the regulated voltage value Vreg.

9 Claims, 2 Drawing Sheets

ACTIVE MODE LINE VOLTAGE REGULATOR FOR RINGING SUBSCRIBER LINE INTERFACE CIRCUIT

FIELD OF THE INVENTION

The present invention relates in general to telecommunication systems and subsystems therefor, and is particularly directed to a new and improved mechanism for limiting the DC voltage applied to a tip/ring amplifier of a subscriber line interface circuit (SLIC) to a voltage that is allowed to comply with minimum on-hook battery requirements, yet prevents a sustained excessively high (and potentially dangerous) voltage from being applied to the SLIC.

BACKGROUND OF THE INVENTION

Subscriber line interface circuits (SLICs) are employed by telecommunication service providers to interface a communication wireline pair with subscriber equipment, including both voice and data communication devices. In order to be interfaced with a variety of telecommunication circuits including circuits providing digital codec functionality, the transmission channels of the SLIC must conform with a very demanding set of performance requirements, including but not necessarily limited to accuracy, linearity, low noise, filtering, insensitivity to common mode signals, low power consumption, and ease of impedance matching programmability. In this regard, the DC voltage parameters of a ringing SLIC are governed by both the operational requirements of the device to which the SLIC is coupled (such as the minimum on-hook voltage (e.g., on the order of 40 VDC) required by a facsimile machine or modem), as well as telecommunication industry safety standards (that currently limit the allowable sustained DC voltage to a value of 56.5 VDC).

A reduced complexity illustration of a conventional multi-current control-based circuit amplifier architecture for complying with this requirement is diagrammatically illustrated in FIG. 1, as comprising a (Tip/Ring) amplifier 10 having its non-inverting (+) input 11 coupled to a voltage dividing node 21 of a voltage divider 20. The voltage divider is formed of a pair of equal valued (R) resistors 22 and 23, that connect a DC battery voltage (VBAT) to ground (GND). The amplifier 10 has an inverting (−) input 12 coupled to an output node 13 by way of a feedback (value R) resistor 14. The inverting (−) input 12 of the amplifier is further coupled to a current source 31, which may be configured as a current mirror, and is operative to supply a current corresponding to that sensed flowing through the voltage divider 20, or I=VBAT/2R.

In order to constrain the amplifier input voltage within prescribed operational limits (e.g., the above referenced 56.5 VDC value) irrespective of the value of the battery voltage VBAT, the inverting (−) input 12 of amplifier 10 is further coupled to a plurality of current source/sink circuits 32 and 33. The current mirror (sink) 32 sinks an equal and opposite polarity current I=VBAT/2R from the inverting polarity (−) input node 12, so that current source/sink pair 31/32 effectively provide a pair of currents at the inverting (−) input node 12 that are complementary to those provided at the non-inverting (+) input node 11, by way of the voltage divider 20. An additional current mirror 33 is used to controllably supply the amplifier's inverting polarity (−) node 12 with an auxiliary, compensation current derived in accordance with MTU specifications and designated in FIG. 1 as current I=Vmtu/R.

Typically, this auxiliary current is generated by sensing the current through resistors 22 and 23, and then comparing the sensed current to a threshold current reference value. The difference between these two currents is applied to current mirror 33, which produces the auxiliary current I=Vmtu/R. Unfortunately, such a multi-current source based regulation scheme not only dissipates substantial power, but is prone to introducing voltage regulation component-based noise into the voice path of the SLIC.

SUMMARY OF THE INVENTION

Pursuant to the present invention, these drawbacks are effectively obviated by dispensing with the MTU-based current compensation circuitry, and instead making a relatively simple circuit modification to the battery voltage supply path, so as to couple a voltage regulator circuit between the battery voltage terminal and the input nodes of the SLIC's tip/ring amplifiers. For present day ringing SLICs, the parameters of the voltage regulator are such as to limit its output voltage to 56.5 VDC. Thus, a battery voltage VBAT having any value less than 56.5 VDC will be replicated as such for application to the amplifier input, while a voltage at or above 56.5 VDC is limited to a value of 56.5 VDC.

In a first embodiment, the voltage regulator circuit is installed between the battery supply terminal VBAT and the battery input end of the voltage divider, to a central node of which of the tip/ring amplifier is coupled. In a second embodiment, the battery input end of the voltage divider is coupled directly to the battery terminal, while the voltage regulator is coupled to the central node to which the amplifier input is coupled. In each embodiment, the current mirror that drives the complementary input node of the amplifier is referenced to the current flowing through that portion of the voltage divider subject to the regulated voltage Vreg, so that the mirrored current is not affected by excessive battery voltage swing. To prevent noise from being introduced into the voice path of the amplifier from the regulated DC supply circuitry, a low pass filter that passes only DC supply energy (for example, one having an upper frequency cut-off on the order to 2–8 Hz), may be incorporated into the current mirror circuitry.

DETAILED DESCRIPTION

Figure 1:
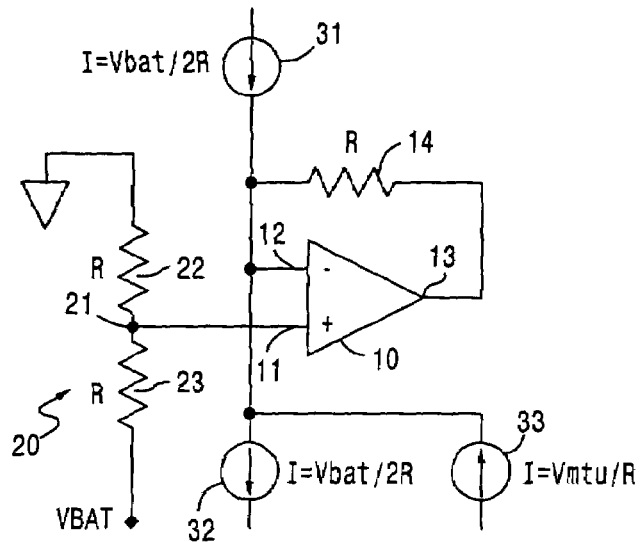
FIG. 1 diagrammatically illustrates a reduced complexity illustration of a conventional multi-current control-based voltage regulation circuit for a tip/ring amplifier of a subscriber line interface circuit.

Before detailing the active mode subscriber line interface circuit voltage regulator of the present invention, it should be observed that the invention resides primarily in a prescribed arrangement of conventional communication circuits and voltage regulation components therefor. As a consequence, this arrangement has been shown in the drawings by readily understandable block diagrams and associated circuit diagrams, which depict only those specific details that are pertinent to the present invention, so as not to obscure the disclosure with particulars apparent to those skilled in the art having the benefit of the description herein, whereby the invention may be more readily understood.

Figure 2:
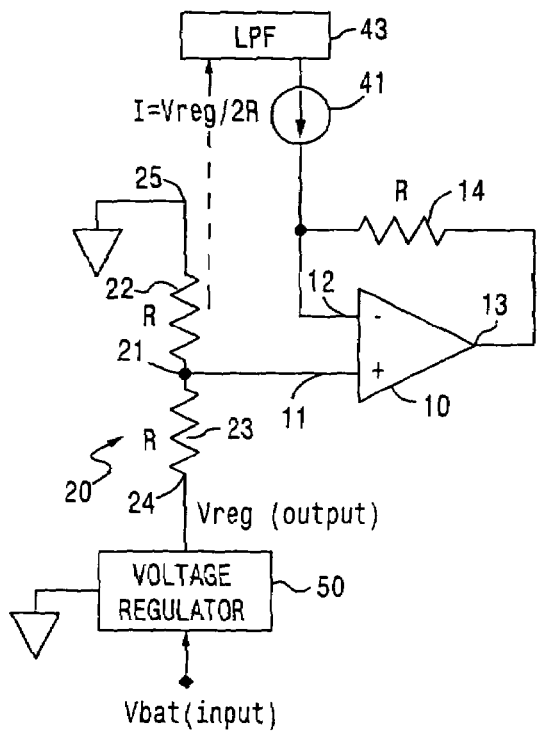
FIG. 2 is a reduced complexity diagram of a first embodiment of the active mode line voltage regulator for a tip/ring amplifier of a ringing subscriber line interface circuit of the invention.

Attention is now directed to FIG. 2, which is a reduced complexity diagram of a first embodiment of the active mode line voltage regulator for a respective tip/ring amplifier of a ringing subscriber line interface circuit of the invention. (It is to be understood that the polarities shown in FIG. 2 may be reversed, without a loss in generality.) Similar to the conventional circuit of FIG. 1, a respective (Tip/Ring) amplifier 10 has its non-inverting (+) input 11 coupled to the voltage dividing node 21 of voltage divider 20 formed of a pair of equal valued (R) series-coupled resistors 22 and 23. A first end 25 of the voltage divider is referenced to a prescribed voltage (shown as GND) and a second end 24 thereof is coupled to receive a prescribed DC voltage (derived from the battery voltage (VBAT)). Also, as in FIG. 1, the inverting polarity (−) input 12 of the amplifier 10 is coupled to output node 13 by way of a feedback resistor 14 (having a value R), and to a (current mirror-configured) current source 41.

In accordance with the invention, rather than the current source 41 driving the amplifier input (−) node 12 with a current based upon the actual battery voltage VBAT, and having to couple that node to an additional, substantial power-dissipating set of voltage regulation current sources as described above, voltage regulation is realized by a relatively simple modification of the input path from battery VBAT to the voltage divider 20 for the (+) input node 11. In particular, a voltage regulator circuit (of conventional configuration) 50 is installed between the battery terminal VBAT and the second end 24 of the voltage divider 20.

For the presently discussed example of a ringing SLIC, the parameters of the voltage regulator 50 are such as to limit its output voltage to 56.5 VDC. Thus, a battery voltage VBAT having any value less than 56.5 VDC would be replicated as such at the input terminal end 24 of the voltage divider 20, while a voltage at or above 56.5 VDC would be limited to a value of 56.5 VDC at node 24. Thus, the current through the voltage divider 20 and therefore the current supplied to amplifier input node 12 by the current source 41 is based upon the regulated voltage Vreg output by the voltage regulator 50, rather than upon the battery voltage VBAT. In particular, the current supplied by current source 41 is the current I=Vreg/2R.

In order to prevent noise from being introduced into the voice path of the amplifier, a low pass filter that passes only DC supply energy (for example, one having an upper frequency cut-off on the order to 2–8 Hz), may be incorporated into the current mirror circuitry, through which the current flowing through the voltage divider 20 is sensed and mirrored by way of current mirror 41 into the inverting node 12 of the amplifier 10. Such a low pass filter (LPF) is shown at 43 in the input path of the current mirror 41.

Figure 3:
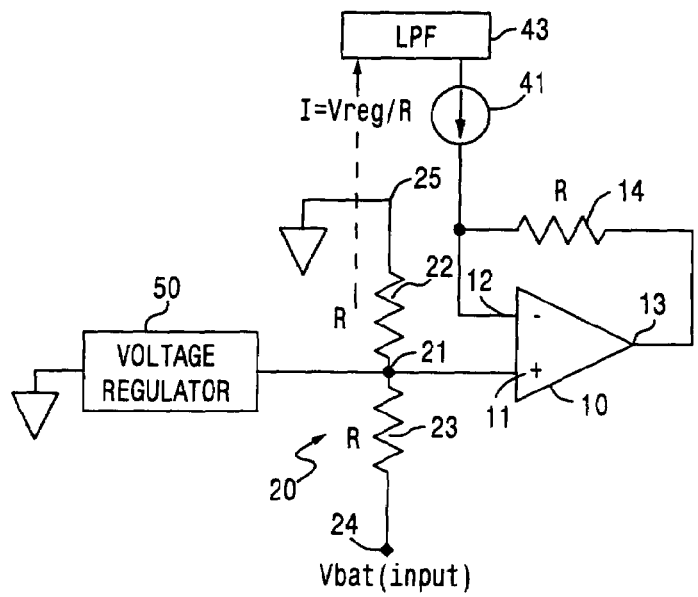
FIG. 3 shows a second embodiment of the active mode line voltage regulator of the invention.

Rather than couple the voltage regulator 50 between the battery VBAT and the voltage divider 20, as in the first embodiment of FIG. 2, the terminal end 24 of the voltage divider 20 may be coupled directly to the battery terminal as in FIG. 1, and the voltage regulator 50 coupled directly to the node 21 to which the amplifier (+) input 11 is coupled, as shown in FIG. 3. In this embodiment, fluctuations in the battery voltage VBAT above Vreg only affect the differential voltage across resistor 23. The current mirror 41 is referenced to the current flowing through resistor 22 of the voltage divider 20, so that its value (I=Vreg/R) is not affected by an excessive battery voltage swing and remains defined by Vreg, but with a single resistor divisor (the value of resistor 22).

Figure 4:
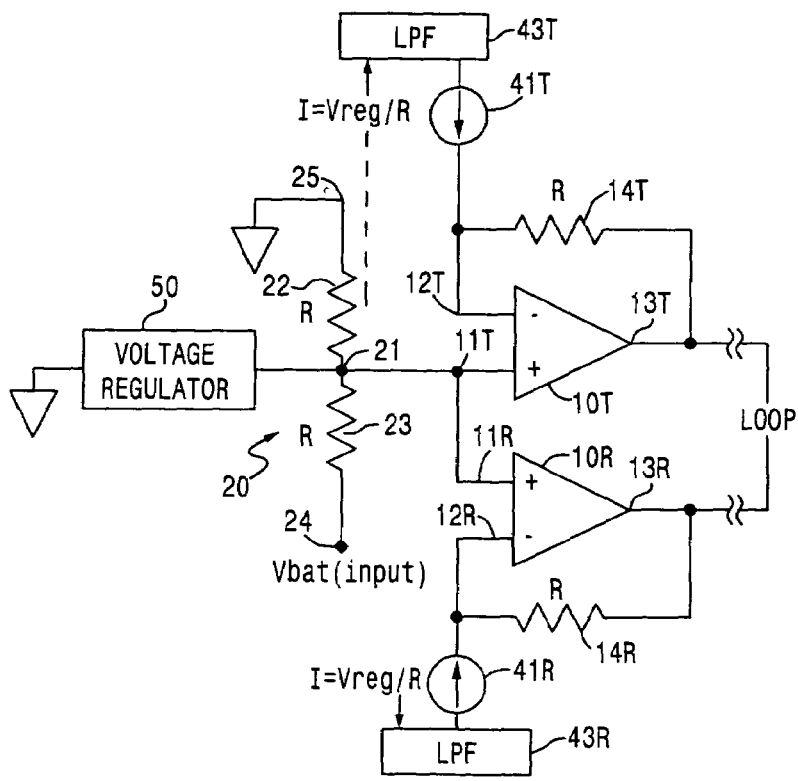
FIG. 4 shows the application of the embodiment of the invention of FIG. 3 to both tip and ring amplifiers of a ringing subscriber line interface circuit.

FIG. 4 shows the application of the embodiment of the invention of FIG. 3 to both tip and ring amplifiers of a ringing subscriber line interface circuit. Here, respective Tip and Ring amplifiers 10T and 10R have their non-inverting (+) inputs 11T and 11R coupled in common to the reference node 21 of the voltage divider 20. The inverting polarity (−) input 12T of the Tip amplifier 10T is coupled to its output node 13T by feedback resistor 14T and to a current source 41T. Similarly, the inverting polarity (−) input 12R of the Ring amplifier 10R is coupled to its output node 13R by a feedback resistor 14R and to a current source 41R. As in the embodiment of FIG. 3, the current mirrors 41T and 41R are referenced to the current flowing through the resistor 22 of the voltage divider 20, and generate opposite polarity currents I=Vreg/R, as shown. FIG. 4 also shows respective low pass filters 43T and 43R incorporated with the current mirror circuits 41T and 41R, to prevent high frequency noise from being introduced into the tip and ring amplifiers, as described above.

As will be appreciated from the foregoing description, circuit complexity and power consumption drawbacks of conventional MTU-based current compensation circuitry of ringing SLIC architectures are effectively obviated by coupling a voltage regulator circuit between the battery voltage terminal and the input nodes of the SLIC's tip/ring amplifiers. Since the current mirror that drives the complementary input node of the amplifier is referenced to the current flowing through that portion of the voltage divider subject to the regulated voltage Vreg, the mirrored current will not be affected by excessive battery voltage swing. Also, incorporating a low pass filter into the current mirror circuitry prevents the introduction of noise from the DC supply circuitry into the voice path of the amplifier.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed:

1. For use with a subscriber line interface circuit (SLIC) having tip and ring amplifiers, each of said tip and ring amplifiers having a first polarity input and a second polarity input, said first polarity input being coupled to a voltage-dividing node of a voltage divider, said voltage divider having an input terminal to which a DC input voltage is applied, and a grounded reference terminal, said second polarity input of said tip amplifier being coupled to receive a first current that is produced by a first current source in accordance with current flowing through said voltage divider as a result of application of said DC input voltage to said input terminal thereof, and independent of the output of said tip amplifier, and said second polarity input of said ring amplifier being coupled to receive a second current that is produced by a second current source in accordance with current flowing through said voltage divider as a result of application of said DC input voltage to said input terminal thereof, and independent of the output of said ring amplifier, the improvement comprising:

a voltage regulator, referenced to ground and coupled to said voltage divider, and being operative, for a first value of DC voltage relative to ground, that is generated at said voltage, dividing node of said voltage divider as a result of said current flowing through said voltage divider in response to application of said DC input voltage to said input terminal thereof, said first value of DC voltage being less than a prescribed value of regulated DC voltage Vreg relative to ground, to cause said first value of DC voltage to be provided by said voltage-dividing node of said voltage divider, and applied thereby to said first polarity inputs of said tip and ring amplifiers and, for a second value of DC voltage relative to ground, that is generated at said voltage-dividing node of said voltage divider as a result of said current flowing through said voltage divider in response to application of said DC input voltage to said input terminal thereof, said second value of DC voltage being at or above said prescribed value of regulated DC voltage Vreg, to limit the value of DC voltage provided by said voltage-dividing node of said voltage divider, and applied thereby to said first polarity inputs of said tip and ring amplifiers, to said prescribed value of regulated DC voltage Vreg relative to ground, so that each of said tirst and second currents is limited in accordance with said regulated DC voltage Vreg relative to ground, irrespective of said DC input voltage exceeding said prescribed value of regulated DC voltage Vreg relative to ground.

2. The improvement according to claim 1, further including first and second low pass filters respectively coupled with said first and second current sources, and being operative to pass DC supply energy and prevent noise from being introduced into voice paths of said tip and ring amplifiers.

3. The improvement according to claim 1, wherein said voltage regulator is coupled directly to said first voltage-dividing node of said voltage divider, so as to directly regulate the voltage at said first voltage-dividing node of said voltage divider to said prescribed value of regulated DC voltage Vreg relative to ground.

4. For use with a subscriber line interface circuit (SLIC) having tip and ring amplifiers, each of said tip and ring amplifiers having a first polarity input and a second polarity input, said first polarity input being coupled to a voltage-dividing node of a voltage divider, said voltage divider having an input terminal to which a DC input voltage is applied, and a grounded reference terminal, said second polarity input of said tip amplifier being coupled to receive a first current that is produced by a first current source in accordance with current flowing through said voltage divider as a result of application of said DC input voltage to said input terminal thereof, and independent of the output of said tip amplifier, and said second polarity input of said ring amplifier being coupled to receive a second current that is produced by a second current source in accordance with current flowing through said voltage divider as a result of application of said DC input voltage to said input terminal thereof, and independent of the output of said ring amplifier, the improvement comprising:

a voltage regulator, referenced to ground and having an input thereof coupled to receive a DC voltage, and an output, thereof coupled to said input terminal of said voltage divider, and being operative, for a first value of said DC voltage relative to ground being less than a prescribed value of regulated DC voltage Vreg relative to ground, to cause said first value of DC voltage to be replicated at said input terminal of said voltage divider, whereby a fraction of said first value of said DC voltage is provided by said voltage-dividing node of said voltage divider, and applied thereby to said first polarity inputs of said tip and ring amplifiers and, for a second value of said DC voltage relative to ground being at or above said prescribed value of regulated DC voltage Vreg, to limit the value of DC voltage at said input terminal of said voltage divider to said prescribed value of regulated DC voltage Vreg relative to ground, whereby a fraction of said prescribed value regulated DC voltage Vreg relative to ground is provided by said voltage-dividing node of said voltage divider, and applied thereby to said first polarity inputs of said tip and ring amplifiers, so that each of said first and second currents is limited in accordance with said regulated DC voltage Vreg relative to ground, irrespective of said DC input voltage exceeding said prescribed value of regulated DC voltage Vreg relative to ground.

5. The improvement according to claim 4, further including first and second low pass filters respectively coupled with said first and second current sources, and being operative to pass DC supply energy and prevent noise from being introduced into voice paths of said tip and ring amplifiers.

6. A method for limiting the value of DC voltage applied to tip and ring amplifiers of a subscriber line interface circuit (SLIC) having tip and ring amplifiers, each of said tip and ring amplifiers having a first polarity input and a second polarity input, said first polarity input being coupled to a voltage-dividing node of a voltage divider, said voltage divider having an input terminal to which a DC input voltage is applied, and a grounded reference terminal, said second polarity input of said tip amplifier being coupled to receive a first current that is produced by a first current source in accordance with current flowing through said voltage divider as a result of application of said DC input voltage to said input terminal thereof, and independent of the output of said tip amplifier, and said second polarity input of said ring amplifier being coupled to receive a second current that is produced by a second current source in accordance with current flowing through said voltage divider as a result of application of said DC input voltage to said input terminal thereof, and independent of the output of said ring amplifier, said method comprising the steps of:

(a) in response to said DC input voltage having a DC voltage value relative to ground that is less than a prescribed value of regulated DC voltage Vreg relative to ground, causing said DC input voltage to be replicated at said input terminal of said voltage divider, whereby a fraction of said DC input voltage is provided at said voltage-dividing node of said voltage divider, in response to said current flowing through said voltage divider as a result of application of said DC input voltage to said input terminal thereof, and applied thereby to said first polarity inputs of said tip and ring amplifiers; and (b) in response to said DC input voltage having a DC voltage value relative to ground that is at or above said prescribed value of regulated DC voltage Vreg relative to ground, limiting the DC voltage at said input terminal of said voltage divider to said prescribed value of regulated DC voltage Vreg relative to ground, whereby a fraction of said prescribed value of regulated DC voltage Vreg relative to ground is provided at said voltage-dividing node of said voltage divider, in response to said current flowing through said voltage divider as a result of application of said DC input voltage to said input terminal thereof, and applied thereby to said first polarity inputs of said tip and ring amplifiers, whereby the magnitude of each of said first and second currents is limited in accordance with said regulated DC voltage Vreg relative to ground, irrespective of said DC input voltage exceeding said prescribed value of regulated DC voltage Vreg relative to ground.

7. The method according to claim 6, further including the step (c) of coupling first and second low pass filters to said first and second current sources, respectively, said first and second low pass filters being operative to pass DC supply energy therethrough, and to prevent noise from being introduced into voice paths of said tip and ring amplifiers.

8. A circuit arrangement for applying a DC voltage to tip and ring amplifiers of a subscriber line interface circuit (SLIC) comprising:
   a voltage divider having an input terminal to which a DC input voltage is applied, a grounded reference terminal, and a voltage-dividing node coupled to a first polarity input of each of said tip and ring amplifiers;
   a first current source that is operative to supply a first current to a second polarity input of said tip amplifier, in accordance with current flowing through said voltage divider as a result of application of said DC input voltage to said input terminal thereof, and independent of the output of said tip amplifier;
   a second current source that is operative to supply a second current to a second polarity input of said ring amplifier, in accordance with current flowing through said voltage divider as a result of application of said DC input voltage to said input terminal thereof, and independent of the output of said tip amplifier; and
   a voltage regulator, referenced to ground and having an input terminal thereof coupled to receive a DC voltage, and an output thereof coupled to said input terminal of said voltage divider, and being operative to regulate a DC voltage relative to ground that is applied to said input terminal of said voltage divider, such that, for said DC voltage having a DC voltage value relative to ground that is less than a prescribed value of regulated DC voltage Vreg relative to ground, said DC voltage regulator replicates said DC voltage at said input terminal of said voltage divider, whereby a fraction of said DC voltage is generated at said voltage-dividing node of said voltage divider, and applied thereby to said first polarity inputs of said tip and ring amplifiers, and such that, for said DC voltage having a DC voltage value relative to ground that is at or above said prescribed value of regulated DC voltage Vreg relative to ground, said DC voltage regulator limits the DC voltage at said input terminal of said voltage divider to said prescribed value of regulated DC voltage Vreg relative to ground, whereby a fraction of said prescribed value of regulated DC voltage Vreg relative to ground is generated at said voltage-dividing node of said voltage divider, and applied thereby to said first polarity inputs of said tip and ring amplifiers, so that the magnitude of each of said first and second currents is limited in accordance with said regulated DC voltage Vreg relative to ground, irrespective of said DC input voltage exceeding said prescribed value of regulated DC voltage Vreg relative to ground.

9. The circuit arrangement according to claim 8, further including first and second low pass filters respectively coupled with said first and second current sources, and being operative to pass DC supply energy and prevent noise from being introduced into voice paths of said tip and ring amplifiers.

* * * * *